United States Patent [19]

Picandet et al.

[11] 4,004,104
[45] Jan. 18, 1977

[54] SYSTEM FOR FEEDING IN CONTINUOUS CURRENT TO A TELEPHONE LINE

[75] Inventors: Jean Picandet, Paris; Francois Boullier, Saint-Ouen, both of France

[73] Assignee: Jeumont-Schneider, Puteaux, France

[22] Filed: Apr. 29, 1975

[21] Appl. No.: 572,724

[30] Foreign Application Priority Data

May 7, 1974 France ............................ 74.15721

[52] U.S. Cl. ............................... 179/70; 179/16 F
[51] Int. Cl.² ...................................... H04M 19/08
[58] Field of Search .......... 179/70, 77, 81 R, 81 A, 179/16 F; 323/8, 22 T

[56] References Cited

UNITED STATES PATENTS

| | | | |
|---|---|---|---|
| 2,897,432 | 7/1959 | Jackson | 323/22 T |
| 3,035,122 | 5/1962 | Livingstone | 179/16 F |
| 3,223,781 | 12/1965 | Hestad | 179/77 |
| 3,906,167 | 9/1975 | Baker | 179/16 F |

Primary Examiner—Kathleen H. Claffy
Assistant Examiner—Gerald L. Brigance
Attorney, Agent, or Firm—Bacon & Thomas

[57] ABSTRACT

A d.c. power supply circuit for a telephone line which utilizes transistor circuits having an active reactance to replace the telephone transformer. The transistor circuits each transform a capacitor into an effectively inductive reactance, thus resulting in a cost and space savings.

8 Claims, 2 Drawing Figures

SYSTEM FOR FEEDING IN CONTINUOUS CURRENT TO A TELEPHONE LINE

BACKGROUND OF THE INVENTION

1. Field of the Invention

The present invention relates to a system for supplying a telephone line with direct current.

2. Description of the Prior Art

It is known that direct current is conventionally supplied with the aid of a transformer having two windings or coils and known as a telephone transformer. The coil connected at the telephone set side is divided into two equal sections between which the d.c. source is connected. The said telephone transformer simultaneously affords current isolation between the telephone set and the switching center.

However, since d.c. flows through the two-section coil of the telephone transformer and it is necessary that the ampere-turns set up by this current should not saturate the magnetic circuit of the telephone transformer, the latter is consequently a heavy, cumbersome and costly apparatus.

SUMMARY OF THE INVENTION

When is it unnecessary to provide current isolation between two sections of the telephone line, the system according to the invention is more advantageous than the prior system from the viewpoints of weight, bulk and cost, since it eliminates the need for the telephone transformer.

The present supply or feed system is characterized in that is comprises, on the one hand, an assembly constituted by the connection in series of:

a first transistor circuit connected for active reactance, a d.c. source, a second transistor circuit connected for active reactance.

The assembly is connected between the two wires of the telephone line, and a capacitor connected in each of the two wires between the point of connection of the said assembly with the telephone line and the exchange of the telephone installation.

BRIEF DESCRIPTION OF THE DRAWINGS

The invention will be better understood with the following description of an exemplary embodiment as shown in the accompanying drawings, in which.

DESCRIPTION OF THE PREFERRED EMBODIMENTS

Figure 1:
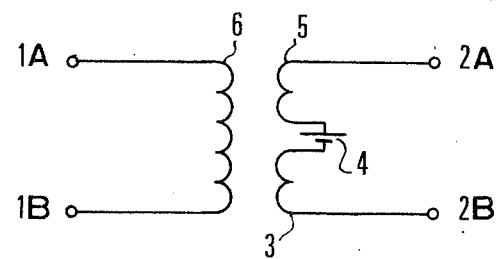
FIG. 1 shows the feed system as known in the prior art.

Referring to FIG. 1, the telephone line of a subscriber is connected by terminals 1A and 1B to the telephone exchange, and by terminals 2A and 2B to the telephone set of the said subscriber. The d.c. feed battery is connected between the equal sections 3 and 5 of one of the windings or coils of the telephone transformer connected between the terminal 2A and 2B, the other coil 6 being connected across the terminals 1A and 1B.

Figure 2:
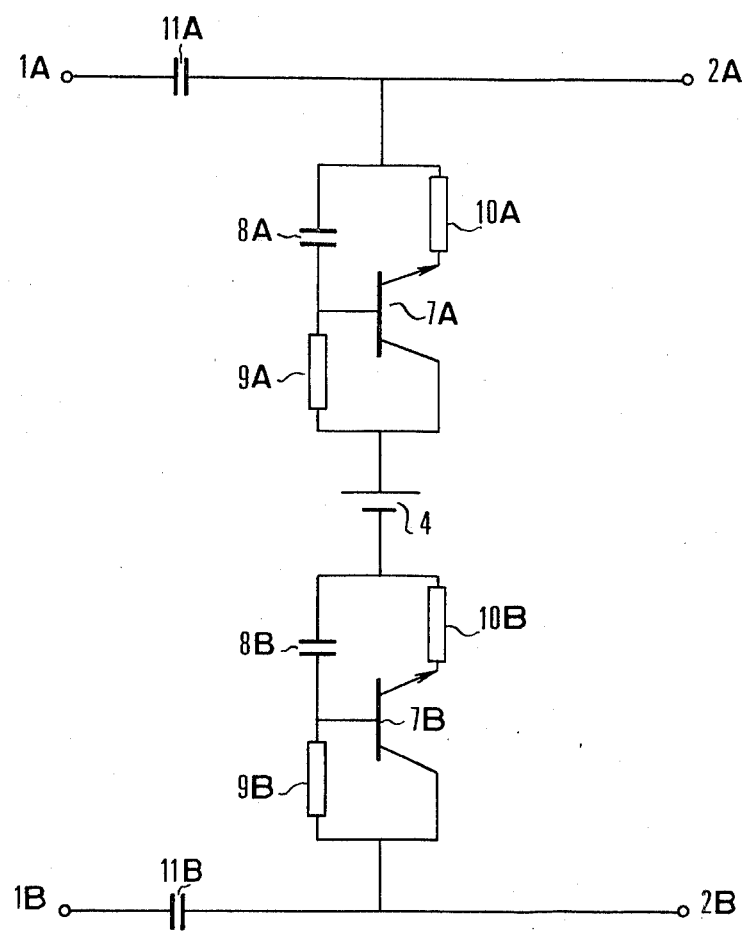
FIG. 2 shows the system according to the invention.

FIG. 2 shows the same terminals 1A, 1B, 2A, 2B and the same battery 4, but the latter is connected between two identical transistor circuits arranged for active reactance.

Such a circuit is of known type and it is known that it is equivalent to a high a.c. impedance.

The circuit connected between the positive pole of the battery 4 and the interconnected terminals 1A, 2A comprises a transistor 7A of NPN type, the first terminal or emitter of which is connected to the terminals 1A–2A through the intermediary of a resistor 10A, the second terminal or collector of which is connected to the positive pole of the battery 4, and the third terminal or base of which is connected on the one hand to the said pole through the intermediary of a resistor 9A and on the other hand to the terminals 1A–2A through the intermediary of a capacitor 8A.

The circuit connected between the negative pole of the battery 4 and the interconnected terminals 1B, 2B is identical with the circuit described above, like elements having the same reference numerals but with addition of the letter B.

Such transistor circuits have a transistor the current gain of which is very much higher than unity. If the value of the resistor 10A or 10B is designated $R_{10}$, the value of the resistor 9A or 9B is designated $R_9$, and the capacity of the capacitor 8A or 8B is designated $C_8$, it can be demonstrated that each transistor circuit is equivalent to a resistor $R_{10}$ in series with an inductance $R_{10}, R_9, C_8$.

In order to block the flow of d.c. towards the telephone exchange, a capacitor 11A is connected between the terminal 1A and the end of the resistor 10A, or of the capacitor 8A, connected to the line 1A–2A.

Similarly, a further capacitor 11B is connected between the connection point of the transistor 7B on the line 1B–2B and the terminal 1B.

In a variant according to the invention, the capacitors 8A and 8B are shunted by a resistor to obtain a supply system which is more independent of the current gains of the transistors.

We claim:

1. A d.c. power supply circuit for connection between telephone exchange terminals and telephone subscriber line terminals comprising:
   a. a d.c. source having two poles,
   b. a first transistor circuit for transforming a capacitive reactance and providing an effective inductive reactance therefor, said first transistor circuit being connected to one pole of said d.c. source and to a first juncture of said exchange and subscriber terminals,
   c. a second transistor circuit for transforming a capacitive reactance and providing an effective inductive reactance therefor, said second transistor circuit being connected to the other pole of said d.c. source and a second juncture of said exchange and subscriber terminals, and
   d. capacitor means connected between each of said transistor circuits and said exchange terminals.

2. A d.c. power supply circuit as recited in claim 1 wherein said first and second transistor circuits comprise identical components.

3. A d.c. power supply circuit as recited in claim 1 wherein said first and second transistor circuits have a current gain greater than unity.

4. A d.c. power supply circuit as recited in claim 1 wherein said first transistor circuit comprises:
   a. a transistor having first, second and third terminals,
   b. resistive means connected between said first transistor terminal and said first juncture, c. resistive means connected between said one pole and said third transistor terminal,
d. capacitive means connected between said third transistor terminal and said first juncture, and
e. said second transistor terminal connected to said one pole.

5. A d.c. power supply circuit as defined in claim 4 wherein said transistor is of NPN type, said first transistor terminal is an emitter, said second transistor terminal is a collector, said third transistor terminal is a base, and said one pole is positive.

6. A d.c. power supply circuit as defined in claim 1, wherein said second transistor circuit comprises:
a. a transistor having first, second and third terminals,
b. resistive means connected between said first transistor terminal and said other pole,
c. resistive means connected between said second juncture and said third transistor terminal,
d. capacitive means connected between said third transistor terminal and said other pole,
e. said second transistor terminal connected to said second juncture.

7. A d.c. power supply circuit as recited in claim 6 wherein said transistor is of an NPN type, said first transistor terminal is an emitter, said second transistor terminal is a collector, said third transistor terminal is a base, and said one pole is positive.

8. A d.c. power supply circuit for connection between telephone exchange terminals and telephone subscriber line terminals comprising:
a. a d.c. source having a positive and a negative pole,
b. a first transistor circuit providing an active reactance and connected to the positive pole of said d.c. source and to a first juncture of said exchange and subscriber terminals, said first circuit including:
an NPN transistor having an emitter, a base, and a collector, and having a current gain substantially greater than unity,
first and second resistors, and
a capacitor,
wherein said emitter of said transistor is connected to said first juncture by said first resistor,
said collector is connected to said positive pole of said d.c. source, and
said base is connected to said positive pole through said second resistor and to said first juncture through said capacitor,
c. a second transistor circuit including:
an NPN transistor having an emitter, a base, and a collector, and having a current gain substantially greater than unity,
a first and second resistor, and
a capacitor,
wherein the emitter of said transistor of said second transistor circuit is connected to said negative pole of said d.c. source by a first resistor of said second transistor circuit,
said collector of said second transistor circuit is connected to a second juncture of said exchange and subscriber terminals,
said base of said transistor of said second transistor circuit is connected to said second juncture by said second resistor of said second transistor circuit, and
d. additional capacitor means connected between each of said transistor circuits and said exchange terminals,
whereby said transistor circuits provide an effective inductive reactance by transformation of the capacitive reactance connected to the bases thereof.

* * * * *

UNITED STATES PATENT OFFICE
CERTIFICATE OF CORRECTION

Patent No. 4,004,104　　　　　　　　Dated January 18, 1977

Inventor(s) Jean Picandet and Francois Boullier

It is certified that error appears in the above-identified patent and that said Letters Patent are hereby corrected as shown below:

Column 2, line 26, change "$R_{10}$, $R_9$, $C_8$" to --$R_{10}$ $R_9$ $C_8$--.

Signed and Sealed this

Thirty-first Day of May 1977

[SEAL]

Attest:

RUTH C. MASON　　　　　　　　C. MARSHALL DANN
*Attesting Officer*　　　　　　　*Commissioner of Patents and Trademarks*